United States Patent
Neumann et al.

(10) Patent No.: US 9,960,410 B2
(45) Date of Patent: May 1, 2018

(54) METHOD FOR PRODUCING COMPOSITE POWDER, AND FOR A POROUS COMPOSITE MATERIAL FOR ELECTROCHEMICAL ELECTRODES THAT IS PRODUCED USING THE COMPOSITE POWDER

(71) Applicant: Heraeus Quarzglas GmbH & Co. KG, Hanau (DE)

(72) Inventors: Christian Neumann, Hungen (DE); Jörg Becker, Niddatal (DE); Sascha Pihan, Aschaffenburg (DE); Matthias Otter, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 470 days.

(21) Appl. No.: 14/409,466

(22) PCT Filed: Jun. 12, 2013

(86) PCT No.: PCT/EP2013/062128
§ 371 (c)(1),
(2) Date: Dec. 18, 2014

(87) PCT Pub. No.: WO2013/189803
PCT Pub. Date: Dec. 27, 2013

(65) Prior Publication Data
US 2015/0325836 A1    Nov. 12, 2015

(30) Foreign Application Priority Data

Jun. 18, 2012   (DE) .......................... 10 2012 011 946

(51) Int. Cl.
| | | |
|---|---|---|
| *H01M 4/04* | (2006.01) |
| *H01M 4/583* | (2010.01) |
| *H01M 4/587* | (2010.01) |
| *B22F 1/00* | (2006.01) |
| *H01M 4/134* | (2010.01) |
| *H01M 4/1395* | (2010.01) |
| *H01M 4/36* | (2006.01) |
| *H01M 4/38* | (2006.01) |
| *H01M 4/62* | (2006.01) |
| *H01M 10/052* | (2010.01) |
| *C04B 38/04* | (2006.01) |
| *C01B 32/00* | (2017.01) |
| *C01B 32/05* | (2017.01) |
| *C01B 32/30* | (2017.01) |

(Continued)

(52) U.S. Cl.
CPC ......... *H01M 4/0416* (2013.01); *B22F 1/0018* (2013.01); *C01B 32/00* (2017.08); *C01B 32/05* (2017.08); *C01B 32/30* (2017.08); *C04B 38/045* (2013.01); *H01M 4/0419* (2013.01); *H01M 4/0471* (2013.01); *H01M 4/0483* (2013.01); *H01M 4/134* (2013.01); *H01M 4/1395* (2013.01); *H01M 4/364* (2013.01); *H01M 4/386* (2013.01); *H01M 4/583* (2013.01); *H01M 4/587* (2013.01); *H01M 4/625* (2013.01); *H01M 10/052* (2013.01); *C03B 19/1492* (2013.01); *C03B 37/005* (2013.01); *C04B 2111/00853* (2013.01); *H01M 4/387* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 7,745,047 B2 * | 6/2010 | Zhamu ................. | H01M 4/133 361/502 |
| 8,568,924 B2 | 10/2013 | Ma et al. | |

(Continued)

FOREIGN PATENT DOCUMENTS

| | | |
|---|---|---|
| DE | 102010005954 A1 | 7/2011 |
| DE | 102011016468 B3 | 2/2012 |

(Continued)

OTHER PUBLICATIONS

Espacenet English language translation of DE 10 2010 049 249 A1, published Apr. 26, 2012.

(Continued)

*Primary Examiner* — Benjamin A Schiffman
(74) *Attorney, Agent, or Firm* — Tiajoloff & Kelly LLP

(57) ABSTRACT

The invention relates to a method for economically producing a composite powder made of carbon and electrochemical active material. According to the invention, a melt made of a meltable carbon precursor substance having nanoparticles made of an active material distributed in the melt is provided, and said melt is divided into the composite powder, in which nanoparticles made of the active material are embedded in a matrix made of the carbon precursor substance. A porous composite material produced using the composite powder is used to produce an electrode for a secondary battery, in particular for use as an anode material. The production of the composite material comprises the following steps: providing template particles made of inorganic template material, producing a powder mixture of the composite powder and the template particles, heating the powder mixture and softening the composite powder in such a way that the composite powder penetrates the pores and is carbonated, and removing the template material to form the porous electrochemical composite material.

19 Claims, 2 Drawing Sheets

Figure 1:
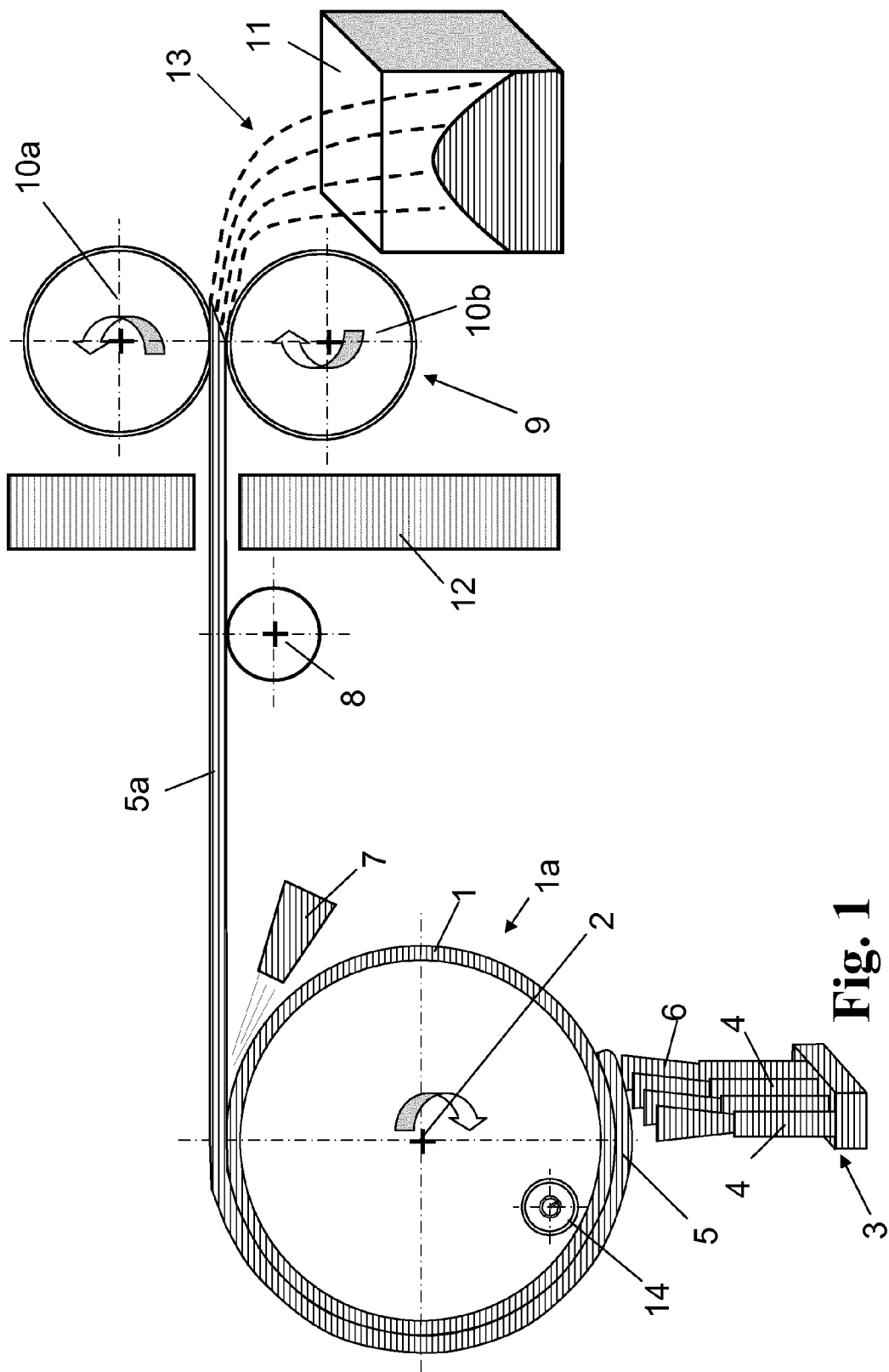

(51) Int. Cl.
  *H01M 4/02* (2006.01)
  *C03B 37/005* (2006.01)
  *C03B 19/14* (2006.01)
  *C04B 111/00* (2006.01)

(56) References Cited

U.S. PATENT DOCUMENTS

| | | |
|---|---|---|
| 2010/0143798 A1 | 6/2010 | Zhamu et al. |
| 2012/0301387 A1 | 11/2012 | Neumann |
| 2013/0136994 A1 | 5/2013 | Ma et al. |
| 2013/0209891 A1 | 8/2013 | Neumann et al. |
| 2014/0045072 A1 | 2/2014 | Neumann et al. |
| 2014/0232031 A1 | 8/2014 | Neumann et al. |

FOREIGN PATENT DOCUMENTS

| | | |
|---|---|---|
| DE | 102010049249 A1 | 4/2012 |
| EP | 2487746 A2 | 4/2014 |
| WO | 2013053679 A2 | 4/2013 |
| WO | 2013081950 A1 | 6/2013 |

OTHER PUBLICATIONS

Espacenet English language translation of DE 10 2011 016 468 B3, published Feb. 23, 2012.

Espacenet English language translation of EP 2487746 A2, published Apr. 16, 2014.

Uday Kasavajjula et al., Nano- and Bulk-silicon-based Insertion Anodes for Lithium-ion Secondary Cells, Journal of Power Sources 163, pp. 1003-1039 (2007).

Wei-Ming Zhang, Tin-Nanoparticles Encapsulated in Elastic Hollow Carbon Spheres for High-Performance Anode Material in Lithium-Ion Batteries, Advanced Materials 20, pp. 1160-1165 (2008).

* cited by examiner

METHOD FOR PRODUCING COMPOSITE POWDER, AND FOR A POROUS COMPOSITE MATERIAL FOR ELECTROCHEMICAL ELECTRODES THAT IS PRODUCED USING THE COMPOSITE POWDER

TECHNICAL BACKGROUND

The present invention refers to a method for producing composite powder from a carbon precursor substance and active material as a semifinished product for a porous composite material for electrochemical electrodes.

Moreover, the invention is concerned with a method for producing a porous composite material for electrochemical electrodes using such a composite powder, and with the use of the composite material.

In the development of portable electronic devices and cars with an electric drive the demand for rechargeable batteries ("accumulators" or "secondary batteries") is rising. Basic demands are a high cell voltage, a high charging capacity with an equivalent weight which is as low as possible. Moreover, a long cycle life is required that is closely related with capacity losses in charging and discharging operations. In this respect conventional nickel-cadmium or nickel-metal hydride cells are more and more replaced by alkali secondary batteries, especially lithium ion cells.

PRIOR ART

The functional principle of alkali secondary batteries is based on the insertion and removal (intercalation and deintercalation) of alkali ions in the positive electrode (cathode) adjoining an electrolyte that allows the movement of alkali ions. In lithium ion batteries the electrochemical active material is formed by lithium or lithium compounds and is present in the cathode as an electron acceptor, e.g. as a composite material consisting of an oxidic lithium compound in intimate contact with an electrically conductive material that simultaneously forms the electrode framework. A widely used cathode material is lithium cobalt oxide ($LiCoO_2$) and the ternary mixtures thereof with nickel and manganese or also lithium iron phosphate ($LiFePO_4$).

The anode (negative electrode) of a lithium ion battery consists in the simplest case of a porous carbon matrix which is capable of intercalation. The matrix can reversibly take up and release lithium ions without the structural and electrical properties thereof being considerably changed. At the moment, metallic anode materials are being developed; these can supplement or completely replace the carbon matrix. Suitable metals are able to form an alloy with lithium at room temperature and thereby permit in theory a much higher lithium loading and thus a higher specific charging capacity of the anode. Since these metals are involved in the electrochemical conversion, they are also called "active material" or "active metal matrix" in the literature. Special attention is presently paid to the active materials silicon, germanium, and tin.

For instance, a single silicon atom is able to bind up to 4.4 lithium atoms in an alloy, which leads to the alloy composition $Li_{22}Si_5$ (=$Li_{4.4}Si$). Therefore, based on the weight, silicon has the theoretically highest charging capacity of 4200 mAh/g.

This alloy formation is however accompanied by a volume change which may lead within a few charging and discharging cycles to a decomposition of the electrode and to a rapid capacity loss. For instance, the volume of the cubic unit cell of the alloy $Li_{22}Si_5$ is about 4 times greater than the volume of the Si atoms involved.

To attenuate this effect of the change in volume, a number of methods have been suggested. A summary as of June 2006 follows from the review article written by Uday Kasavajjula, Chunsheng Wang, John Appleby, *Nano- and. Bulk-Silicon-Based Insertion Anodes for Lithium-Ion. Secondary Cells*, J. Power Sources, Vol. 163 (2007), pp. 1003-1039.

Thus composite materials of carbon and of an active metal are promising candidates for future anode materials with a high charging capacity and long cycle life.

Good results were achieved e.g. with nano composite materials in which tin nanoparticles are encapsulated in hollow carbon spheres with an extremely thin wall (Wei-Min Zhang et al.: "Tin-Nanoparticles Encapsulated in Elastic Hollow Carbon Spheres for High-Performance Anode Material in Lithium-Ion Batteries"; Adv. Mater. 2008 (20), pp. 1160-1165). For the production of the metal-containing hollow spheres monodisperse $SiO_2$ particles with a diameter of 100 nm are used as the template material. $SnO_2$ with a thickness of 25 nm is deposited on the particles by hydrolysis of $Na_2SnO_3$ and gas phase deposition, and the template material is removed by etching. On the $SnO_2$ hollow spheres, a porous carbon layer with a thickness of 20 nm is subsequently produced by pyrolysis of glucose under hydrothermal conditions and subsequently carbonized by heating at 700° C. into a graphite layer. On account of the reducing effect of the carbon and the high temperature, the $SnO_2$ layer is here reduced into metallic tin which accumulates in liquid phase under the action of the surface tension into a multitude of spherical tin nanoparticles that adhere to the inner wall of the graphite layer.

The nanospheres obtained thereby consist of up to 74% by wt. of tin nanoparticles and up to 26% by wt. of carbon and provide a free internal volume for the alloying of lithium with the tin nanoparticles. The internal volume of the hollow spheres and the elasticity of the thin carbon cover reduce the formation of mechanical stresses during alloying with lithium or removal from the alloy.

Although this Sn—C composite material is in principle suited as a semifinished product for anodes of a lithium-ion secondary battery, manufacturing processes including a method step with gas phase deposition are often so complicated and expensive that they are not suited for the production of mass products, such as secondary batteries for everyday needs.

An anode production based on powder processing is normally less time-consuming and cost-intensive. In a manufacturing method of this type, which is known from the above-cited review article, PVC and Si powders are homogeneously mixed in the weight ratio of 3:7 and the mixture is pyrolyzed at a temperature of 900° C. for one hour. The powder obtained after pyrolysis is ground for 2 hours, again mixed with PVC in the same weight ratio, and subjected to further pyrolysis under the already mentioned conditions.

The effect of the second pyrolysis step is seen in that the Si nano powder particles are thereafter embedded into a carbon matrix and the free surface produced by the grinding process is simultaneously reduced. This multiphase composite structure attenuates the volume jump during alloying of lithium and permits the maintenance of a high charging capacity and a long cycle life.

A further improved cycle life is achieved with a modification of this multiphase composite structure in that SiO and graphite powders are homogeneously ground for 18 hours and the resulting powder mixture is dissolved in furfuryl alcohol, ethanol and water, and hydrochloric acid is added to this suspension for the purpose of polymerization. The $SiO_2$ powder disintegrates into Si and $SiO_2$ phases by carbonization at 1000° C. Si phase regions with sizes of about 5 nm to 10 nm are here surrounded by $SiO_x$ phase and this phase, in turn, is dispersed in a finely divided form in a carbon matrix. The anode produced therefrom shows an initial charge capacity of 700 mAh/g which after the first charge cycles rapidly declines to 620 mAh/g and is stabilized at this value up to the $200^{th}$ cycle.

The high initial capacity loss is attributed to the irreversible incorporation of lithium into the $SiO_x$ phase, whereby thermodynamically stable lithium silicates are formed.

The said review article also mentions anodes of carbon aerogels which have Si nanopowder admixed thereto. To prepare the gel, resorcinol and formaldehyde are mixed and heated to a temperature of 85° C. until a viscous aerogel is obtained. Si nanopowder is added to the viscous aerogel and thereafter kept at the temperature for 10 hours. Subsequently, sintering is carried out at a temperature of 650° C. with formation of a multiphase structure in which the Si nanoparticles are homogeneously embedded in a highly porous, three-dimensional carbon matrix.

Even when a large amount of lithium is incorporated, the high internal porosity of this composite material can attenuate the associated increase in volume. The anodes produced from this material therefore show an extraordinarily high reversible charging capacity of around 1450 mAh/g, but only up to 50 charging cycles. However, the initial irreversible charging capacity with about 550 mAh/g is also very high, which can be ascribed to the large inner surface of the carbon matrix which leads to irreversible losses of lithium ions in the anode.

Apart from high charging capacities, charging times that are as short as possible are also desired for a secondary battery. For a good and quick charging capacity, ease of access to the inner surfaces of the electrode material is desired for the electrolyte. On the other hand, electrode materials with a large surface tend to incorporate lithium, which manifests itself as an irreversible loss in the intercalation of lithium and thus as a charge loss.

Therefore, a high permeability together with a surface that is as small as possible is of advantage. In this connection a so-called "hierarchical porosity" turns out to be advantageous. Large surfaces can be provided by pores in the nanometer range. To enhance the accessibility to such pores, these are ideally connected through a continuous macroporous transport system.

For the production of porous carbon with such a pore structure, so-called "template methods" are known. In these methods the surfaces of a temporary preform of porous material (the "template") is coated with carbon and the template material is removed in the end. $SiO_2$ gel, porous glass, aluminum oxide or other porous heat-resistant oxides are known as suitable template materials.

DE 10 2010 005 954 A1 describes a template material produced on the basis of a soot deposition process for producing a porous carbon product. First of all a porous $SiO_2$ template of agglomerated or aggregated $SiO_2$ nanoparticles is produced by hydrolysis or pyrolysis of a silicon-containing start compound by means of a soot deposition process. The pores are infiltrated with a carbon precursor substance. After carbonization the $SiO_2$ template is removed by etching.

What is left is a porous carbon product with a hierarchical pore structure of a platelet-like or flake-like morphology which can easily be divided into smaller particles that are further processed into molded bodies or layers for producing electrodes of secondary batteries e.g. by means of standard paste or slurry methods.

Patent application EP 2 487 746 A2, published after the priority of the present application, describes the production of a carbonaceous cathode for a secondary battery in that a multitude of start substances are mixed with one another, the mixture is convectively dried and subsequently thermally treated at 400° C. to 1200° C. The start substances contain a carbon source and other substances, such as iron or silicon. The iron or the iron compound may be present as a powder with particle sizes between 50 nm and 750 nm.

Soot, graphite and natural and synthetic polymers, saccharides, organic acids, carbon nanotubes are inter alia mentioned as a carbon source. "Glucose" which is processed in a suspension with the other start substances is used in the embodiment and the suspension is sprayed. Carbon sources are also said to be useful that do not evaporate at temperatures in the range of 400° C. to 1200° C., but decompose, for instance, in the melt.

In the known method an electrode material is obtained that is composed of discrete particles consisting of carbon and transition metal compounds; here, the discrete particles of carbon do not contact one another or only contact one another at a single point. Carbon particles contact one another in any desired way; particles of the transition metal compound are separately present. The carbon particles do not form a matrix for the incorporation of active material particles.

Technical Objective

It is the object of the present invention to provide a method for an inexpensive production of a composite powder from a carbon precursor substance and electrochemical active material.

Furthermore, it is the object of the present invention to indicate a method which using the non-porous or slightly porous composite powder permits a reproducible production of a composite material for producing an electrode for a secondary battery, especially for use as an anode material.

General Representation of the Invention

As for the composite powder, the object is achieved according to the invention by a method comprising the following steps:
(a) producing a melt from a meltable carbon precursor substance with nanoparticles distributed in the melt from an active material,
(b) dividing the melt or a molten body obtained by solidification of the melt into the composite powder in which nanoparticles of the active material are embedded in a matrix consisting of the carbon precursor substance.

According to the invention the composite powder is produced via a melting process. A homogeneous distribution of the nanoparticles of the active material can be achieved, optionally also supported by additional homogenization methods, such as stirring or refining, in the melt more easily than in the solid aggregate state. A carbon precursor substance which is meltable without significant decomposition is used for producing the melt.

Nanoparticles of the active material are contained in the melt. These have a particle size of less than 100 nm, preferably less than 40 nm. The smaller the particles, the easier is the distribution and compensation of mechanical stresses caused by a change in volume due to alloying (incorporation of lithium) with the active material or due to removal from the alloy (release of lithium).

The homogeneous melt is processed into powder in the end. This is done in the simplest and preferred case through the intermediate step of cooling and solidifying the melt so as to form a solid molten body which is subsequently comminuted mechanically by using standard methods, such as crushing or grinding. Alternatively, the melt in liquid or viscous form is divided into drops, e.g. by atomizing or spraying.

The result of the method is at any rate a composite powder made up of active material and the carbon precursor substance. In the composite powder particles, nanoparticles of the active material are embedded homogeneously and in a fine distribution in a matrix of the carbon precursor substance. The carbon matrix produced from the melt has a low porosity as a rule.

The composite powder serves to provide the active material in a fine and homogeneous distribution and surrounded by a more or less porous carbon matrix. It can be used in this form as a semifinished product for the further processing into electrochemical components, particularly electrodes of a lithium-ion secondary battery. A particularly suitable form of the further processing of the composite material shall be explained in more detail further below.

An improvement with respect to a maximally homogeneous distribution of the active material in the melt and thus in the carbon matrix is achieved in that the preparation of the melt comprises a preceding dry blending of powders consisting of the carbon precursor substance and the active material, and the subsequent fusion of the dry mixture.

The incorporation of finely divided active material into a carbon-rich and usually viscous melt may pose difficulties. This problem is avoided by way of dry premixing in which previously produced powders from both the meltable carbon precursor substance and the active material are provided, and said powders are premixed in the solid state. During dry mixing a further comminution of the respective start powders is possible. The homogeneous powder mixture is subsequently heated to such an extent that the particles of the carbon precursor substance are melting without carbonizing.

With respect to a further processing of the composite powder as the electrode material, it has turned out to be advantageous when by dividing according to method step (b) a composite powder is produced with a mean particle size of less than 100 µm, preferably less than 50 µm. Particle sizes of less than 5 µm are however difficult to produce and to handle and are not preferred.

The active material contains Si; preferably, it consists of Si or of an alloy of Si and Sn.

Silicon and tin are suited for the alloy formation with lithium atoms at room temperature and are in this respect suitable active materials for lithium secondary batteries.

In theory, the charging capacity of the anode is increasing with the weight percentage of active material. Pure active-material electrodes, however, decompose because of the change in volume when lithium is incorporated or removed from the alloy, as has already been explained above. The carbon matrix of the composite powder serves to create a framework or a casing for mitigating such volume changes. In the case of the method according to the invention, the production of a composite powder has turned out to be useful where a weight percentage of 10 to 50%, preferably between 20% and 30%, represents the active material.

With respect to a use in a lithium-ion secondary battery, minimal adsorption is desired for an electrolyte, for lithium or for an active material. Therefore, also after a carbonization process the carbon matrix should show a microporosity that is as low as possible. Micropores are characterized by a pore diameter of 2 nm or less. Pitch is preferably used for this reason as a carbon precursor substance.

Pitch, particularly "mesophase pitch", is a carbonaneous material which can be molten without decomposition and which can be transferred by carbonization relatively easily into a graphite-like structure of low microporosity. It is e.g. characterized in that micropores with a pore diameter of less than 2 nm represent less than 10% of the total pore volume.

As for the production of the porous composite material for electrochemical electrodes, the aforementioned object is achieved according to the invention by a method which by using the composite powder obtained according to the method of the invention comprises the following method steps:

(I) providing template particles of inorganic template material respectively forming a pore-containing template framework of interconnected nanoparticles;
(II) producing a powder mixture from the composite powder and the template particles;
(III) heating the powder mixture and softening the composite powder such that it penetrates into the pores of the template framework and is carbonized;
(IV) removing the template framework so as to form the porous electrochemical composite material.

The porous template particles according to method step (I) are e.g. produced by milling porous bodies of the template material, by breaking layers of the template material, by pressing a finely divided powder of the template material, by sol-gel methods or by means of granulation methods. The more finely divided the template particles are, the faster, more efficient and more uniform is the infiltration under otherwise identical process conditions. For the method according to the invention a small, ideally monodisperse, particle size distribution is advantageous, which is e.g. achieved by sieving.

The method according to the aforementioned DE 10 2010 005 954 A1 is particularly suited for the production of template material and template particles. The template particles are here produced on the basis of a soot deposition process. As for the method for producing template particles of inorganic template material, which respectively form a pore-containing template framework of interconnected nanoparticles, this publication is herewith explicitly incorporated into the present application.

According to the invention powders which are prefabricated from carbon and active material and which in the solid state are homogeneously blended with one another are provided for both the template material and the composite material.

The homogenized powder mixture is subsequently heated to such an extent that the carbon precursor of the composite powder melts in contact with the template particles and the melt can penetrate in a strongly wetting form into the pores of the template powder. As a consequence, nanoparticles of active material that are distributed in the melt also pass into said pores. The homogeneous powder mixture ensures that molten carbon precursor is always in intimate contact with the template particles, resulting in a distribution and occupation via the available pore volume of the template material, which pore volume is to be infiltrated.

Carbonization of the carbon precursor from the original composite powder takes place at the same time as or subsequently to the infiltration of the pores of the template particles. Temperatures of up to 3000° C. are in principle suited for carbonization; preferably, however, carbonization takes place at a temperature clearly below 1000° C. and in a gas that is without oxygen, if possible, or under vacuum. The minimum temperature for the carbonization is defined on the basis of the decomposition temperature of the carbon precursor and is e.g. around 500° C.

With a low viscosity of the composite powder melt a sufficiently high filling degree of the pore volume can already be achieved in the case of a nonrecurring infiltration.

Due to the decomposition and evaporation process during carbonization the deposited composite material is shrinking, the degree of shrinkage depending on the carbon content of the original composite powder. After carbonization one obtains a mass in which carbonized porous composite material and template material are intimately mixed with one another.

The template material is removed from said mass, leaving a carbon framework penetrated by active material and consisting of the carbonized porous composite material which is here called "composite material" of active material and carbon.

The inorganic template material is preferably removed by chemical dissolution; in the case of a $SiO_2$ template, particularly acids (such as hydrofluoric acid) or bases (such as sodium hydroxide) should here be mentioned as solvents.

The composite material is substantially free of template material. Thus the inorganic template material serves just as a mechanically and thermally stable framework for depositing and carbonizing the carbon filled with active material.

The process product is a composite material consisting of more or less porous carbon and of active material embedded therein in a homogeneous distribution. Special characteristics of this composite material which make it suited for the production of electrochemical components—particularly the anode—for lithium secondary batteries are:
1. embedment and fixation of active material in a matrix of porous carbon obtained by carbonization of the original carbon precursor, and
2. accessibility of this active material via the channel system with hierarchical pore structure which is given by the original template material.

With the local fixation of the active material a loss of active material and of lithium alloyed therewith and thus a gradual loss of charge are avoided. The composite with the electrically conductive carbon matrix ensures permanent electrical contacting of the active material together with a high accessibility for an electrolyte.

The multimodal pore structure provides, on the one hand, transport channels via which the active material is accessible for electrolyte and lithium ions, and, on the other hand, a free pore volume which can mitigate volume changes due to the incorporation and removal of lithium and active material into and from the alloy, whereby mechanical stresses can be reduced and a decomposition of the electrode structure prevented or delayed.

This effect will be explained hereinafter in more detail with reference to a particularly preferred template material. The provision of the template particles comprises a soot deposition process in which a feedstock is converted by hydrolysis or pyrolysis into template material particles and these are deposited on a deposition surface so as to form a soot body from the template material, and that the soot body is comminuted into the template particles.

In this variant of the composite material production according to the invention the production of the template comprises a gas phase deposition of agglomerated soot particles which are obtained as porous soot. A liquid or gaseous start substance is here subjected to a chemical reaction (hydrolysis or pyrolysis) and deposited from the gas phase as a solid component on a deposition surface. The reaction zone is e.g. a burner flame or an electric arc (plasma). With plasma deposition methods or CVD methods of such types, which are e.g. known under the names OVD, VAD, MCVD, PCVD or FCVD methods, synthetic quartz glass, tin oxide, titanium nitride and other synthetic materials are produced on an industrial scale.

It is important for the suitability of the deposited template material for the production of a template that the template material is obtained as porous soot on the deposition surface, which may e.g. be a vessel, a mandrel, a plate or a filter. This is ensured in that the temperature of the deposition surface is kept so low that a dense sintering of the deposited template material is avoided. A thermally consolidated, but porous "soot body" is obtained as an intermediate product.

In the soot deposition process the template material may also be present in the form of soot powder which is subsequently further processed by granulation, press, slurry or sinter methods into the template particles. Granulates or flakes should here be mentioned as intermediate products. At any rate the template is a soot structure with nanoparticles connected with one another in the form of a network. Here, the etching away of the template material by the advancing etchant can take place within the soot structure itself.

Preferably, the template material is $SiO_2$.

Synthetic $SiO_2$ can be produced at relatively low costs on an industrial scale by soot deposition methods using inexpensive start substances. The $SiO_2$ template withstands high temperatures during carbonization. The upper limit of the temperature is predetermined by the onset of the reaction of $SiO_2$ with carbon into SiC (at about 1000° C.). The removal of the template material in the form of synthetic $SiO_2$ according to method step (e) is carried out by chemical dissolution in an acid or in an alkaline solution.

With the soot body obtained by way of a soot deposition method, it turns out to be particularly advantageous that this body has an anisotropic mass distribution with hierarchical pore structure due to the production process. The reason is that during gas phase deposition primary particles are formed in the reaction zone and these are agglomerating on their way to the deposition surface into nanoparticles. Depending on the degree of interaction with the reaction zone on their way to the deposition surface, different numbers of primary particles are agglomerating, basically resulting in a wide particle size distribution of the nanoparticles in the range of about 5 nm to about 200 nm. The nanoparticles are interconnected via so-called sinter necks. Rather large voids or pores which in the soot body and in segments thereof form a system of interconnected macropores are obtained between the individual nanoparticles. A certain thermal consolidation of the soot body is desired and achieved in that the soot body is partly sintered either during the deposition process or in an alternative or supplementary way in a separate heating process following the deposition process, so that a porous coherent template framework is formed in which spherical nanoparticles are aggregated or agglomerated into larger units and interconnected via so-called "sinter necks".

The layer of the template material which is produced by soot deposition can be comminuted with little effort, resulting in template particles with platelet-like or flake-like morphology. Due to the manufacturing process these show the above-described oligomodal pore size distribution with hierarchical pore structure.

Such template particles which are distinguished by a non-spherical morphology are particularly advantageous for use in the method according to the invention. The reason is that particles with a spherical morphology, i.e. particles with a ball shape or an approximately ball-shaped morphology, have a small surface in relation to their volume. By comparison, particles with a non-spherical morphology show a greater ratio of surface to volume; this simplifies infiltration with the molten composite material and makes it more uniform.

The smaller the thickness of the template particle, the simpler and more homogeneous is the infiltration with the molten composite material. In this respect it has turned out to be advantageous when the template particles have a mean thickness in the range of 10 μm to 500 μm, preferably in the range of 20 μm to 100 μm, particularly preferably less than 50 μm.

Template particles with a thickness of less than 10 μm have a low mechanical strength and aggravate the formation of a pronounced hierarchical pore structure. At thicknesses of more than 500 μm it gets more and more difficult to ensure a homogeneous infiltration of the molten composite material.

With the mixing ratio of composite material and template material, the filling degree of the pores is set. Preferably, composite powders and template particles are intermixed in a volume ratio in the range between 0.05 and 1.6, preferably in a volume ratio in the range between 0.1 and 0.8.

At a mixing ratio of 0.05 the inner surfaces of the template material are covered with only a layer having a small thickness, which just results in a spongy web of carbon+ active material. Smaller mixing ratios are therefore not preferred. By contrast, at a mixing ratio of 1.6 one obtains a substantially filled pore structure, depending on the original pore volume of the template material. A small pore space remains at a mixing ratio above 1.6.

In the composite material which is present after removal of the template material, nanoparticles of the active material are embedded into a porous carbon matrix and are accessible via a channel system of open pores for an electrolyte. The volume which before the removal of the template material was occupied by spherical nanoparticles and their aggregates/agglomerates now represents cavities which are three-dimensionally networked with one another via former sinter necks that are now open. The active material is thus embedded in a carbon matrix and can simultaneously be accessed by an electrolyte via open, locally defined cavities which are interconnected via the former sinter necks of the template material and which were formerly occupied by the nanoparticles. The mean sizes of the cavities are within the range of mesopores which typically have a pore size in the range of 2 nm to 50 nm and more.

The pore volume which is available in the cavities helps to reduce mechanical stresses that would be created by the additional incorporation of lithium into the carbon matrix or its release, and might lead to a destruction of the spatial structure of the porous carbon matrix.

With the method according to the invention one achieves an inexpensive composite material of porous carbon and of a relatively high electrical conductivity in direct connection with an active material for electrochemical energy storage. The active material particles contained in the composite material with sizes in the nanometer range are adapted to incorporate further substances, specifically lithium, so that the composite product is particularly suited for use as an electrode material.

As for the use of the composite powder according to the invention or the porous composite material according to the invention, the above-indicated object is thus achieved according to the invention in that these components are used for producing an anode for a rechargeable lithium battery.

A method for producing a porous composite material for electrochemical applications using the composite powder produced according to the invention has been explained above. The composite powder is distinguished by a homogeneous embedment of active material in a matrix consisting of a carbon precursor and is adapted to be further processed also in a different way into electrochemical components.

The composite material is obtained in the method according to the invention as a monolith or with a platelet-like or flake-like morphology which can easily be divided into smaller particles. These are further processed by means of standard paste or slurry methods into molded bodies or layers to obtain an electrode, for instance, for a lithium battery on the basis of the methods known from the prior art.

Since for the production of the composite material a porous template with soot structure is used, the inner surfaces of the pores and cavities are occupied with the composite material of carbon precursor and active material, so that the pore structure and particle distribution given in the template is more or less transferred to this coating. The nanoparticles of active material that are embedded in the carbon matrix are reliably contacted electrically in the composite material via a three-dimensional carbon network.

EMBODIMENT

The invention is hereinafter explained in more detail with reference to embodiments and a drawing. In detail, in a schematic representation, FIG. 1 shows an apparatus for producing $SiO_2$ granulate particles which serve as template particles in the method according to the invention; and FIGS. 2 to 5 show method steps in the production of the composite material according to the invention, in a schematic representation.

1. PRODUCTION OF COMPOSITE POWDER OF CARBON AND SILICON—FIRST COMPONENT

Monodisperse, substantially spherical Si nanoparticles with a particle size of about 30 nm are commercially available. The Si nanoparticles are homogeneously intermixed with finely ground powder of mesophase pitch in the weight ratio 3:1 (pitch:Si nanoparticles). The homogenized power mixture is heated to a temperature of 300° C., so that the pitch melts into a low-viscosity melt. Due to the previously generated powder homogenization the Si nanoparticles are substantially homogeneously distributed in the pitch melt. On account of their small size and the density similar to the pitch melt, the Si nanoparticles do also not settle or float. A stirring of the melt can therefore be dispensed with.

After a melting period of 2 h the pitch melt cools down into a molded body in which Si nanoparticles are now present in a substantially homogeneous and finely divided form. The molded body consists of a substantially dense pitch matrix in which the Si nanoparticles are embedded.

Particle sizes between 10 μm and 30 μm are sieved for further processing. They serve as a first component for the production of a composite material.

2. PRODUCTION OF TEMPLATE PARTICLES—SECOND COMPONENT

The apparatus shown in FIG. 1 serves the production of porous granulate particles of $SiO_2$ which are used in the method of the invention as hard template particles 13. The apparatus comprises a drum 1 which is rotatable about its rotation axis 2 and which consists of a basic body of special steel which is covered with a thin layer of silicon carbide. The drum 1 has an outer diameter of 30 cm and a width of 50 cm. A layer 5 of $SiO_2$ soot is deposited on the jacket surface 1a of the drum 1 and slightly thermally densified directly into a porous $SiO_2$ soot plate 5a.

Flame hydrolysis burners 4 of which four are arranged one after the other in a common burner row 3 in the direction of the longitudinal axis 2 of the drum are used for the soot deposition. The burner row 3 is reciprocated in parallel with the rotation axis 2 between two stationary turning points. The flame hydrolysis burners 4 are fed with oxygen and hydrogen as combustion gases and with octamethylcyclotetrasiloxane (OMCTS) as feedstock for the formation of $SiO_2$ particles. The size of the $SiO_2$ primary particles produced thereby are in the nanometer range; here, several primary particles agglomerate in the burner flame 6 and are obtained in the form of more or less spherical aggregates with a specific BET surface area in the range of 25 $m^2/g$; these form a continuous $SiO_2$ soot layer 5 of uniform thickness on the jacket surface 1a of the drum.

In the embodiment, the rotational speed of the drum 1 and the deposition rate of the flame hydrolysis burners 4 are matched such that one obtains a $SiO_2$ soot layer 5 with a width of about 40 cm and a thickness of about 45 μm (the soot layer is plotted in FIG. 1 with an exaggerated thickness for reasons of representation). The burners 4 simultaneously produce a certain pre-sintering of the soot layer 5 into a soot plate 5a by generating a mean temperature of about 1200° C. on the surface of the topmost soot layer. Pre-sintering is supported by a tubular infrared radiator 14 which is arranged in the left lower quadrant within the drum 1 formed as a hollow drum, and which heats the jacket surface of the drum 1 from the inside shortly after application of the soot layer 5.

The porous and slightly pre-sintered soot plate 5a obtained thereby has a mean relative density of about 22% (based on the density of quartz glass with 2.21 $g/m^3$).

After a little more than half a drum rotation the soot plate 5a passes into the sphere of action of a blower 7 by means of which a gas stream directed against the bottom side of the soot plate 5a is produced, so that the soot plate 5a lifts off from the jacket surface 1a of the drum.

The soot plate 5a is subsequently supplied via a support roll 8 to a crushing tool 9 which is made up of two oppositely rotating rolls 10a, 10b between which a gap with the thickness of the soot plate 5a is provided, and the surfaces of which are provided with longitudinal profiles.

The soot plate 5a which passes through the gap is divided by the longitudinal profiles of the rolls 10a, 10b into fragments having about the same size (granulate particles=template particles 13) which are collected in a collection receptacle 11.

A partition wall 12 which is provided with an opening for passing the soot plate 5a therethrough and which serves to shield the soot deposition process against the impacts of the comminuting process is provided between the drum 1 and the crushing tool 9.

The template particles 13 obtained according to the method have a platelet-like or flake-like morphology and a thickness corresponding approximately to the thickness of the soot plate 5, i.e. about 45 μm. They exhibit more or less planar top and bottom sides as well as lateral fracture areas with open pores.

The particle size fraction with side lengths between 500 μm and 1,000 μm has been separated by sieving for further processing. The structure ratio "A", i.e. the ratio of maximum structure width (a or b) and thickness (c) of the template particles 13, is about 20 in the embodiment.

In addition to the above-described composite powder, the $SiO_2$ template particles 13 produced thereby serve as a further component for the production of a composite material. The production thereof shall be explained in more detail hereinafter with reference to an example and FIGS. 2 to 5.

3. PRODUCTION OF A COMPOSITE MATERIAL CONSISTING OF FIRST COMPONENT AND SECOND COMPONENT

Figure 2:
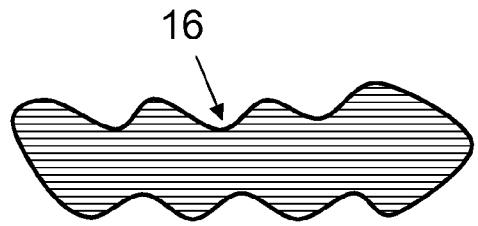

Viewed under the microscope, the non-spherical, platelet-like template particles 13 are composed of a multitude of spherical aggregates of $SiO_2$ primary particles which are interconnected, thereby forming a "soot framework". A single primary particle aggregate 16 of such a type is schematically shown in FIG. 2, which consequently shows a section of a "soot framework".

The composite powder (as the first component) and the $SiO_2$ primary particle aggregates 16 (as the second component) are homogeneously intermixed in a volume ratio of 1:2 (composite powder:primary particle aggregate) by means of a mixer. The mixing period is about 5 min.

The particle mixture is subsequently heated to a temperature of 300° C. The low-viscosity pitch which is infiltrated with Si nanoparticles 14 covers the small $SiO_2$ primary particle aggregates 16 and penetrates into and infiltrates the pores. The volume ratio of composite powder and primary particle aggregate is here chosen such that the pitch fills the pores to such an extent that after an infiltration period of 30 min there hardly remains a significant free pore volume.

Figure 3:
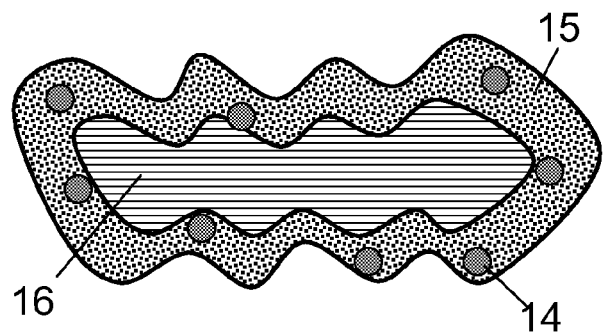

FIG. 3 schematically shows the composite obtained thereby, which consists of primary particle aggregate 16, covered by a pitch layer 15 infiltrated by Si nanoparticles 14.

Figure 4:
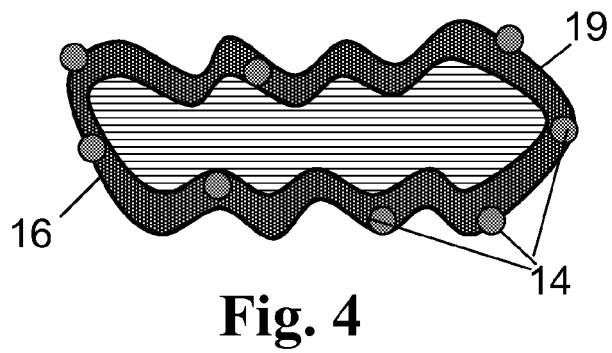

After the infiltration period of 30 min the temperature is raised to 700° under nitrogen and the pitch of the composite layer is reduced to carbon (carbonized). Thereafter the original pitch layer forms a graphite-like carbon layer 19 of reduced thickness. Due to shrinkage the embedded Si nanoparticles 14 are partly exposed or they get closer to the surface of the primary particle aggregate 16 or closer to the free surface, as schematically shown in FIG. 4.

The carbon layer 19 has a low porosity and has a thickness of about 50 nm on average. It should here be noted that the representation of FIGS. 2 to 5 is not true to scale.

After cooling one obtains a slightly porous composite mass consisting of non-spherical porous $SiO_2$ template particles 13 that are everywhere covered with a layer of graphitizable carbon and active material.

The $SiO_2$ of the template particles 13 is subsequently removed in that the composite mass is introduced into a bath of 2-molar NaOH solution. Since the template particles consist of nanoparticles which are interconnected like a network, the NaOH solution can advance within the network structure until the whole template material is removed.

Figure 5:
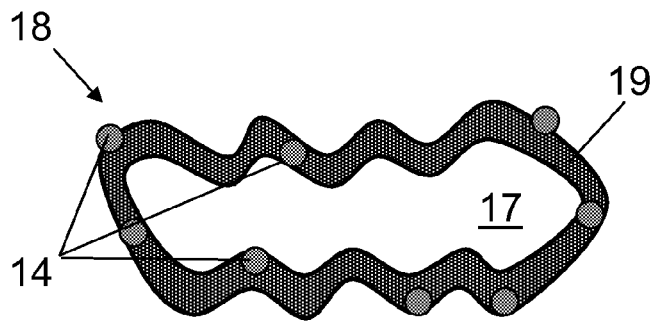

FIG. 5 schematically shows the composite material with the composite structure 18 as obtained after the $SiO_2$ primary particle aggregate has been etched away. This structure consists of a graphite-like carbon layer 19 in which nanoparticles 14 of silicon are embedded. The carbon layer 19 forms the inner wall of a cavity 17 which was originally occupied by a $SiO_2$ nanoparticle agglomerate, i.e. by a primary particle aggregate 16. The Si nanoparticles 14 are freely accessible at least in part.

The composite structure 18 extends in all spatial directions and is approximately a negative image of the mass distribution of the original $SiO_2$ primary particle aggregate 16. It has a hierarchical pore structure and forms the composite material loaded with active material 14 within the meaning of the invention.

It is important that the cavity 17 is not closed, but fluidically connected to other mesopores and macropores. It provides a free pore volume and further surface via which the Si active material fixed in the carbon matrix is accessible for an electrolyte and lithium for alloying.

The composite structure 18 obtained thereby is further comminuted in case of need. This yields carbon flakes loaded with active material, in which rather large cavities pass in the form of channels through a finely rugged surface. These carbon flakes with hierarchical structure are particularly well suited for the production of electrode layers of a rechargeable battery.

The invention claimed is:

1. A method for producing a porous composite material for electrochemical electrodes, said method comprising:
   providing template particles of inorganic template material, said particles forming a pore-containing template framework of interconnected nanoparticles;
   producing a composite powder from a meltable carbon precursor substance and active material by:
   a. producing a melt from the meltable carbon precursor substance with nanoparticles of the active material distributed in the melt; and
   b. dividing the melt or a molten body obtained by solidification of the melt into the composite powder, wherein the nanoparticles of the active material are embedded in a matrix of the carbon precursor substance;
   producing a powder mixture after said producing of the melt and dividing by mixing the composite powder and the template particles, wherein the powder mixture has the composite powder and template particles intermixed therein in a volume ratio that is in a range between 0.05 and 1.6;
   heating the powder mixture and softening the composite powder after said mixing so as to form a softened composite such that the softened composite penetrates into the pores of the template framework and is carbonized; and
   removing the template framework so as to form the porous composite material.

2. The method according to claim 1, wherein said providing of the template particles comprises a soot deposition process in which a feedstock is converted by hydrolysis or pyrolysis into template material particles of a template material, and depositing said template material particles on a deposition surface so as to from a soot body of the template material, and comminuting the soot body into the template particles.

3. The method according to claim 2, wherein the template material is $SiO_2$.

4. The method according to claim 2, wherein the template particles have a mean thickness in the range of 10 µm to 500 µm.

5. The method according to claim 2, wherein the template particles have a mean thickness in the range of 20 µm to 100 µm.

6. The method according to claim 2, wherein the template particles have a mean thickness in the range of 20 µm to 50 µm.

7. The method according to claim 2, and further comprising producing an anode for a rechargeable lithium battery from the porous composite material.

8. The method according to claim 1, wherein the porous composite material that is produced has nanoparticles from the active material that are embedded in a porous carbon matrix and that are accessible for an electrolyte through a channel system of open pores.

9. The method according to claim 1, and further comprising producing an anode for a rechargeable lithium battery from the composite material.

10. The method according to claim 1, wherein the dividing produces a composite powder having a mean particle size of less than 50 µm.

11. The method according to claim 1, wherein the active material consists of Si or of an alloy of Si and Sn.

12. The method according to claim 1, wherein the composite powder has a weight proportion between 20% to 30% of the active material.

13. The method according to any one of claim 1, wherein said composite powder and template particles are intermixed in a volume ratio ranging between 0.1 and 0.8.

14. The method according to claim 1, wherein the meltable carbon precursor and the active material are powders, and wherein the producing the melt comprises dry mixing the powders of the carbon precursor substance and the active material so as to produce a dry mixture, and then melting of the dry mixture.

15. The method according to claim 1, wherein the dividing comprises mechanically grinding the molten body.

16. The method according to claim 1, wherein the dividing produces a composite powder having a mean particle size of less than 100 µm.

17. The method according to claim 1, wherein the active material contains Si.

18. The method according to claim 1, wherein the composite powder has a weight proportion of 10% to 50% of the active material.

19. The method according to claim 1, wherein the carbon precursor substance is pitch.

* * * * *